United States Patent [19]

Lee

[11] 4,251,102
[45] Feb. 17, 1981

[54] ELEVATING ROOFS

[76] Inventor: David Lee, Northchurch House, Northchurch, Hertfordshire, England

[21] Appl. No.: 2,359

[22] Filed: Jan. 10, 1979

[30] Foreign Application Priority Data

Jan. 19, 1978 [GB] United Kingdom ............... 02168/78

[51] Int. Cl.³ .................................................. B60P 3/34
[52] U.S. Cl. .................................... 296/160; 135/4 A; 296/170
[58] Field of Search ............... 296/160, 164, 165, 167, 296/170; 135/1 A, 3 A, 4 A, 5 A, 7.1 A

[56] References Cited

U.S. PATENT DOCUMENTS

| 3,466,082 | 9/1969 | Branch | 296/164 |
| 3,659,893 | 5/1972 | Steele | 296/164 |
| 3,712,316 | 1/1973 | Leonard | 135/1 A |
| 4,055,366 | 10/1977 | Lee | 296/160 |
| 4,058,133 | 11/1977 | Barr et al. | 296/160 |
| 4,077,662 | 3/1978 | Kauffman | 296/165 |

Primary Examiner—John J. Love
Assistant Examiner—Ross Weaver
Attorney, Agent, or Firm—Strimbeck, Davis & Soloway

[57] ABSTRACT

The invention relates to an elevating roof for use in conjunction with a vehicle having a substantially rectangular roof opening defining a pair of longitudinal edges and a pair of transverse edges, of the type comprising a rigid substantially rectangular member adapted to be hinged along one longitudinal edge thereof to said roof, for movement between a lowered position covering said opening and a raised position where it provides one wall of the elevating roof, a canopy of foldable material to extend between corresponding edges of said rigid member and said opening which is unfolded in the raised position of said rigid member to provide the other walls of said elevating roof.

An object of the invention is to provide improved sleeping accommodation, which accommodation is also an improvement over that provided by the invention of Applicants' British Pat. Specification No. 1,485,975.

The invention is characterized in that support framework means for the canopy comprises two generally U-shaped members, the limbs of one U-shaped member each has an associated transversely movable planar member supported in a plane above and substantially parallel to the plane of said opening and movable from a stowed position over the vehicle roof to an extended transverse position, the bridges of both U-shaped members are attached to said foldable material of the canopy at spaced positions on a wall portion thereof opposite to said rigid member whereat, in the elevated position, they support said opposite canopy wall portion so that it overhangingly juts out well beyond said opening, the extended planar members providing transverse sleeping berths. The roof arrangement also enables full length collapsible sleeping berths to be provided within the length of the roof opening.

6 Claims, 9 Drawing Figures

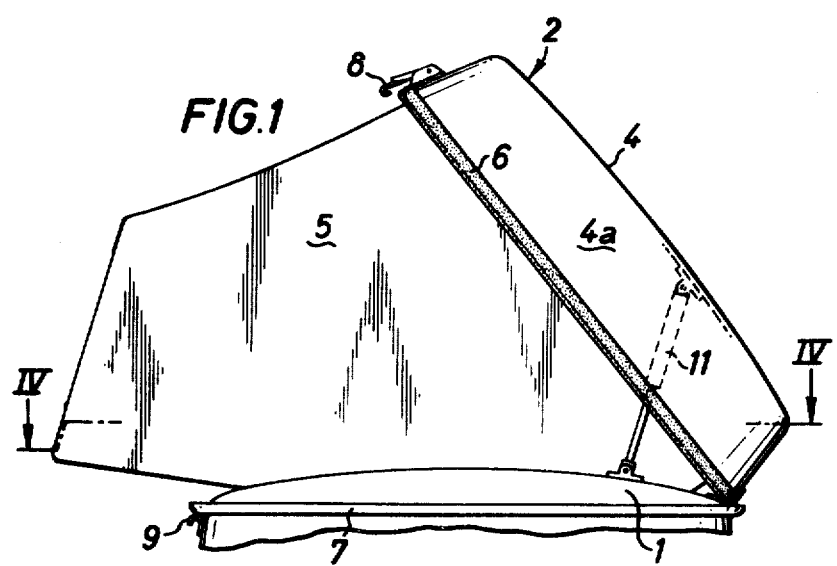
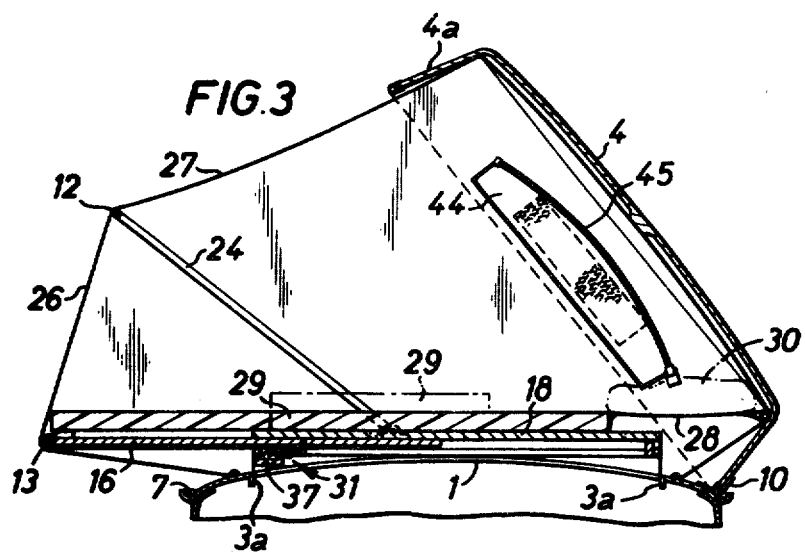

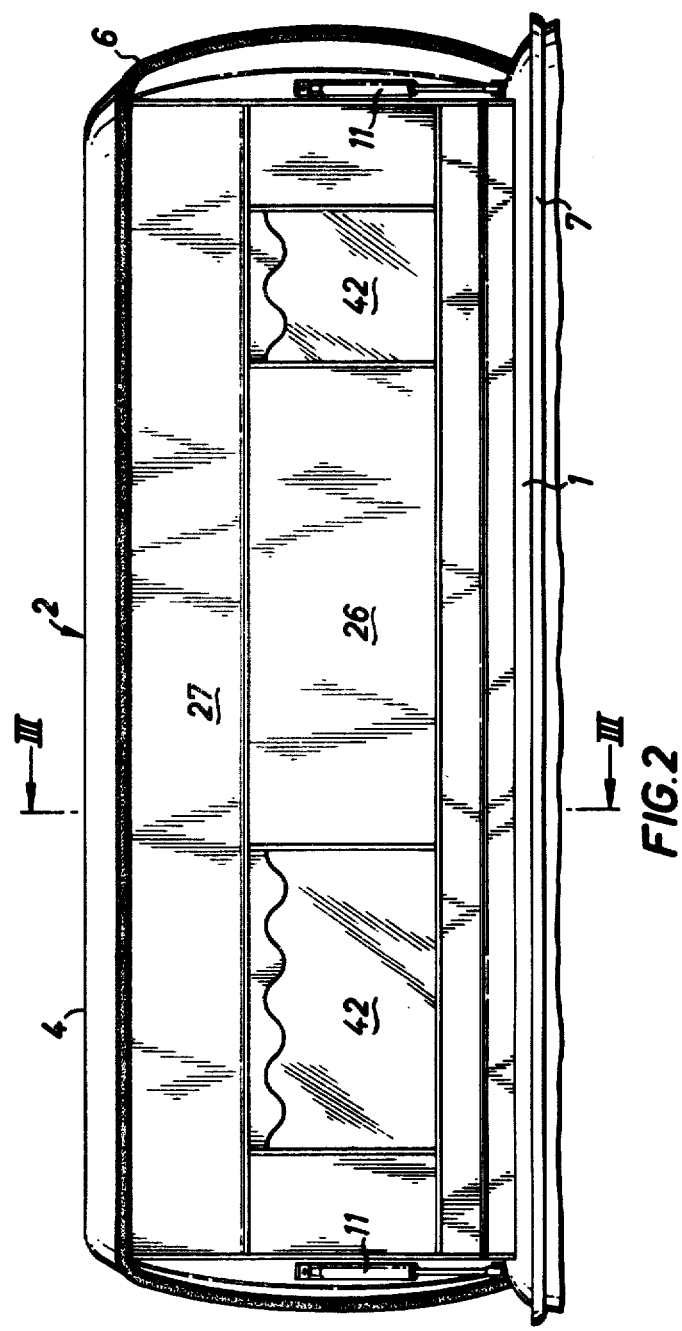

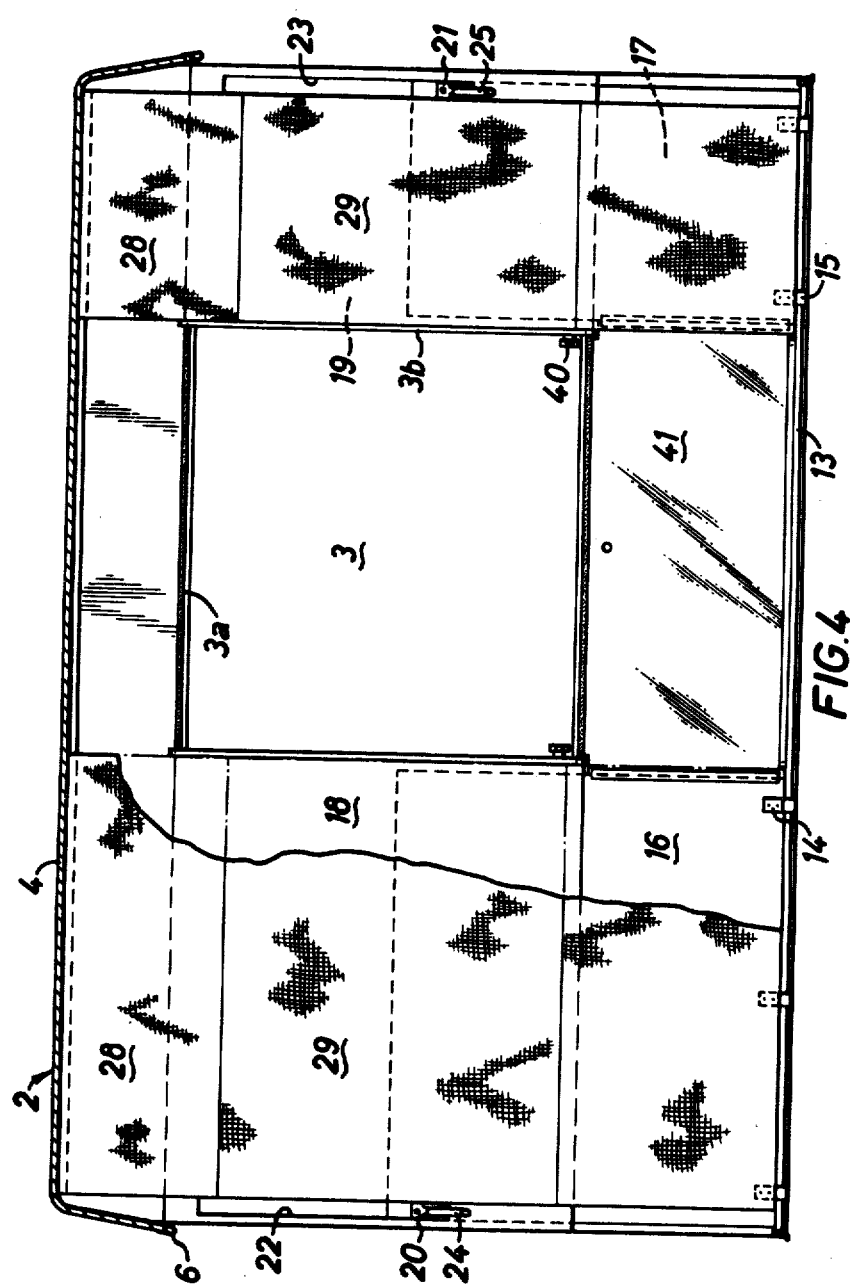

ELEVATING ROOFS

This invention relates to elevating roof arrangements for use in conjunction with a vehicle such as a van or caravan having a substantially rectangular roof opening which has a pair of longitudinal edges and a pair of transverse edges, and is an improvement in the elevating roof arrangement described and claimed in our British Pat. Specification No. 1485975.

Said Patent Specification is concerned with an elevating roof comprising, in combination, a rigid substantially rectangular member adapted to be hinged along one edge thereof to said roof, parallel to said longitudinal edges, for movement between a lowered position covering said opening and a raised position where it provides one wall of the elevating roof, a canopy of foldable material to extend between corresponding edges of said rigid member and said opening, which canopy, in use, in unfolded in said raised position of said rigid member to provide the other walls of said elevating roof arrangement.

The invention claimed in our Patent Specification comprises a support framework arrangement for the canopy whereby the elevating roof can be elevated by a sequence of steps such that the wall provided by said canopy opposite to said rigid member overhangingly juts out beyond said opening to provide, at least for a lower part of said roof arrangement, an area which is greater in plan than the area of said opening.

Particularly in the case of vehicles intended to provide the facility of overnight accommodation, such an elevating roof also creates space in which one or more collapsible berths can be accommodated. However, prior to the arrangement of our said Patent Specification a disadvantage with known forms of elevating roof is that the area over which the roof is elevated is restricted particularly by the width of vehicle on which the roof is mounted, which, in turn, restricts the area for accommodating sleeping berths; the arrangement of our said Patent Specification reduces this disadvantage significantly.

An object of the present invention is to provide an improved arrangement of such an elevating roof particularly in respect of the provision of sleeping accommodation.

According to the present invention an elevating roof of the type referred to above for use in conjunction with a vehicle having a substantially rectangular roof opening defining a pair of longitudinal edges and a pair of transverse edges, is characterised in that support framework means for the canopy comprises two generally U-shaped members, the limbs of one U-shaped member each has an associated transversely movable planar member supported in a plane above and substantially parallel to the plane of said opening and movable from a stowed position over the vehicle roof to an extended transverse position, the bridges of both U-shaped members are attached to said foldable material at spaced positions on a wall portion thereof opposite to said rigid member, whereby said elevating roof can be elevated by a sequence of steps comprising: raising said rigid member and thereby also moving the bridge of the other U-shaped member to a partially raised position, and thereafter moving said one U-shaped member and its associated planar members transversely outwardly, the limbs of said another U-shaped member being so associated with the limbs or planar members of said one U-shaped member that both of said U-shaped members are urged to respective limit positions whereat they support said opposite wall portion of the canopy in a position substantially outwardly beyond that longitudinal edge of said opening which is opposite to said hinge, such that a region of said canopy associated with said wall portion overhangingly juts out well beyond said opening to provide, at least for a lower part of said roof arrangement, an area which is appreciably greater in transverse dimension than said opening.

According to a feature of this invention a collapsible berth arrangement for an elevating roof of the type referred to above, is characterised in that a board is mounted at or adjacent one longitudinal edge of the roof opening, which is of sufficient length to accommodate the length of the berth, said sliding berth being arranged to be slidable transversely with respect to said opening between an outward stowed position and an inward erected position within the roof opening and, in that a strip of foldable material is connected adjacent to the respective side of the vehicle and the outer longitudinal edge of the slidable board so that, in the erected position, a planar berth surface is provided for supporting a mattress.

In order that the invention may be readily understood and further features made apparent, one embodiment and a modification thereof, as applied to an elevating roof for a motor caravan, will now be described with reference to the accompanying drawings in which:

FIG. 1 is an external end view of the roof in its raised condition,

FIG. 2 is an external side view of the roof in its raised condition,

FIG. 3 is an internal end view on the line III—III of FIG. 2,

FIG. 4 is an internal plan view on the line IV—IV of FIG. 1,

Figure 5:
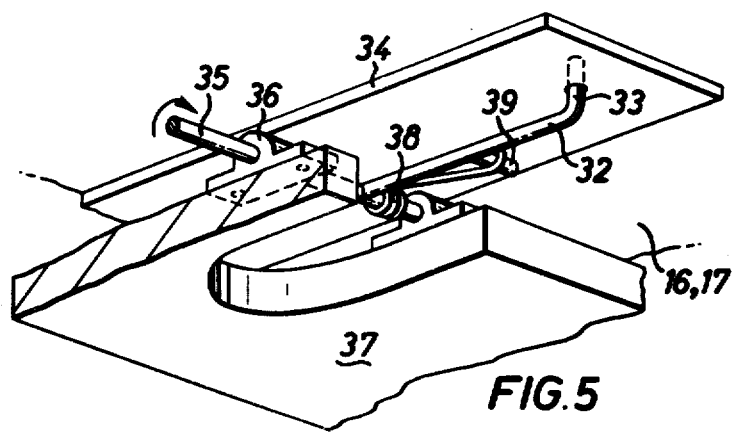
FIG. 5 is a fragmentary enlarged view of the locking arrangement for maintaining the roof in its raised condition.

Referring to FIGS. 1 and 2 the roof 1 of the motor caravan has an elevating roof arrangement 2 which covers and is significantly larger than a rectangular roof opening 3 (see FIG. 4) having a pair of longitudinal edges and a pair of transverse edges which are faced with elongated facing strips 3a and 3b respectively.

The elevating roof 2 includes a rigid roof member 4 and a canopy 5 of suitable waterproof foldable material, for example, PLASTOLENE (Registered Trade Mark). In the closed condition of the elevating roof, the roof member 4 extends over the entire area of the roof 1, said member having a peripheral wall 4a, the lower edge of which is covered by a rubber sealing strip 6 and is dimensioned to sit within a gutter 7 provided around the periphery of the roof 1. In this closed condition the roof member 4 is releasably fixed by pivotal hook members 8 provided on said roof member, and corresponding members 9 fixed to the adjacent side wall of the vehicle.

To ensure a firm seating, the hook members 8 are adjustable for length. As shown in FIG. 3, one longitudinal lower edge of the roof member 4 is hinged, via hinges 10, to the roof 1 adjacent the gutter 7, and the wall 4a of said roof member is of a sufficient depth to accommodate the foldable canopy 5 together with its associated framework described hereinafter.

To move the elevating roof to its raised condition all that is necessary is to release the hook members 8, 9, then (by standing inside the vehicle within the roof opening 3) to push the roof member 4 upwardly to the angled position shown in FIGS. 1 and 2, and finally to adjust the framework to open out the canopy 5 for it to take the shape, again as shown in FIGS. 1 and 2; to facilitate raising the roof member 4, a pair of telescopic arms 11 are provided one at each end of the roof 1 (see particularly FIG. 2), each arm being in the form of a piston and cylinder unit filled with a fluid, such as nitrogen, under pressure. The arms are thus effective to apply upward pressure to the roof member during raising and to maintain said pressure in the raised condition.

The elevating roof described above is basically similar to that described in our British Pat. Specification No. 1,485,975. However, in accordance with the present invention, the canopy 5 opens out to provide an elevated roof space which is appreciably wider (i.e. a greater transverse dimension) than that described in said Patent Specification. This results in the canopy overhanging the side of the vehicle by a significant amount (although it will be appreciated that the overhang will vary depending upon the width of the particular vehicle to which the elevating roof is fitted). This is achieved by a modified framework which will now be discussed, particularly with reference to FIGS. 3 and 4. Thus, the framework comprises an upper and a lower longitudinally extending elongated rod 12, 13 respectively which are located (for example by pockets or straps stitched onto the fabric of the canopy) at predetermined spaced positions. The lower rod 13 is attached, via brackets 14, 15 respectively onto two transverse sliding planar members in the form of boards 16 and 17. Each board 16, 17 is arranged to move from a stowed position under a fixed planar member, also in the form of a board 18, 19 respectively, arranged centrally over the vehicle roof 1 and longitudinally spaced on each side of the rectangular opening 3, to an extended position (as shown in FIGS. 3 and 4) in which it projects beyond the side of the vehicle and thereby provides the overhang for the canopy 5. Each sliding board 16, 17 has a bracket 20, 21 respectively fixed thereon, which brackets are located to project through respective transverse slots 22, 23 (see FIG. 4) provided in the fixed boards adjacent each canopy end, and a support arm 24, 25 respectively of an appropriate length is pivoted at one end to each bracket and is connected at its other end to the upper rod 12. Hence, when the roof member 4 is lifted to its angled position as discussed hereinbefore, the upper frame member 12 is partially raised by the canopy material. The sliding boards 16, 17 are then moved to their extended positions to provide, via the lower rod 13, the canopy overhang, and simultaneously the arms 24, 25 are urged (by transverse sliding movement of the brackets 20, 21) to move rod 12 further upwardly and to push the canopy material outwardly into the position shown in FIG. 3. Thus, in cross-section, the canopy 5 provides an angled side wall 26 and a top wall 27, the interior canopy space thus provided being of substantial width (i.e. the transverse dimension) with adequate headroom. A significant advantage of this arrangement is that the width provided in the canopy space is such that the fixed and sliding boards, together with a longitudinally extending strip 28 of material (see FIG. 3, which as shown is connected along one longitudinal edge to the fixed boards 18, 19 and along its other longitudinal edge to the roof member 4) provide surfaces for beds of full adult length; to complete the beds, again as shown in FIG. 3, each surface has a mattress 29 (preferably of foam material) which can be folded from a stowed position shown chain-dotted to an open position covering the extended sliding boards 16 and 17 and a pillow 30, also shown chain-dotted and located on the strip of material 28.

Each sliding board 16, 17 is releasably fixed in its extended position by a pin-locking arrangement 31, which is shown in detail in FIG. 5. Thus, the locking arrangement comprises a bent rod 32 providing a pin 33 adapted to engage in an aperture 34 provided in a metal plate 35 attached to the underside of its sliding board 16 or 17. The rod 32 projects from a shaft 35 rotatably mounted in a pair of bearing brackets 36 mounted on support board 37 suitably located (see FIG. 3) above the roof 1 of the vehicle. The pin 33 is urged towards its engaged position by a torsion spring 38 acting on a limb 39 of the rod 32 and can be released by rotation of the shaft 35 in the direction of the arrow. To facilitate this, the shafts 35 can be extended through apertures in their respective facing strips 3b on which operating knobs 40 (see FIG. 4) are non-rotatably mounted.

Figure 6:
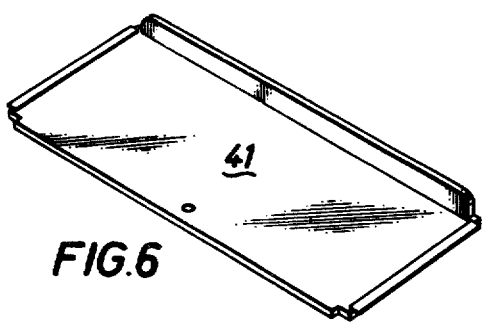
FIG. 6 is a view of a part associated with the roof.

As shown in FIG. 6 a loose board 41 can be provided dimensioned to locate above the overhang (see FIG. 4) between the extended sliding boards 16 and 17 so as to provide a convenient support shelf.

Plastics windows 42 (see FIG. 2) are set into the canopy side wall 26 to provide for natural light and at least one air circulation vent 43 is provided which can be opened and closed by flap 44 and zip fastener 45 (see FIG. 3).

In the embodiment described above, the boards 16, 18 towards the front of the vehicle provide a double-bed surface, whilst the boards 17, 19 provide for a single bed. Thus, the arrangement can provide for sleeping accomodation for three adults within the elevating roof and transversely of the vehicle. Clearly, the actual sleeping accomodation can be designed depending upon the roof size of the particular vehicle concerned and can be maximised by reducing, as much as convenient for access, the longitudinal dimension of the rectangular opening 3. This is different from the arrangement of the embodiment described in our said British Patent Specification (see FIG. 7) where the longitudinal dimension of the rectangular opening is sufficient to accomodate longitudinally extending hammock type beds.

It will be appreciated that, as with the embodiment described in said British Patent Specification, the framework comprises basically two U-shaped frames, one frame being provided by the upper rod 12 (defining the bridge) and arms 24 (defining the limbs) and the other frame being effectively provided by the lower rod 13 (defining the bridge) and the sliding boards 16 and 17 (defining the limbs).

Figure 7:
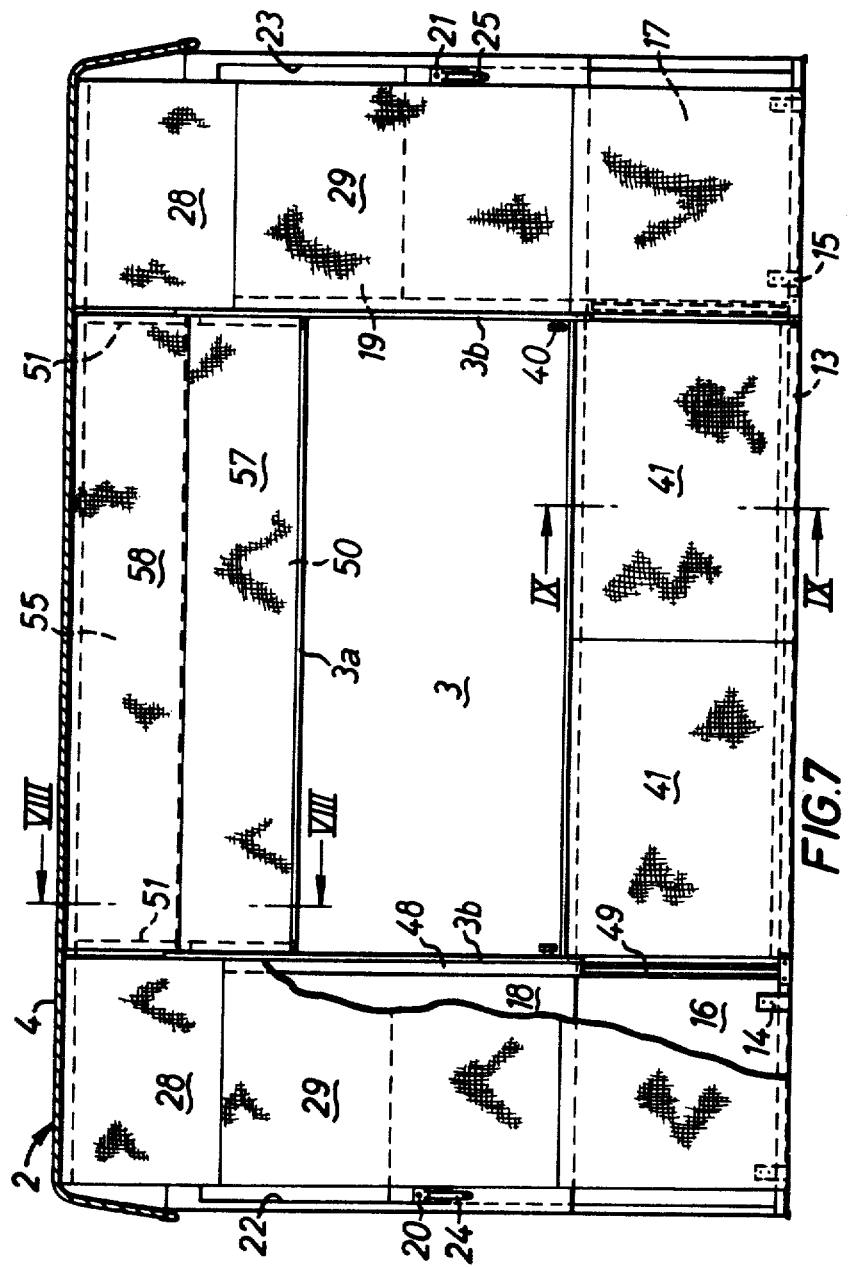
FIG. 7 is an internal plan view similar to FIG. 4 of a modified form of elevating roof.
Figure 8:
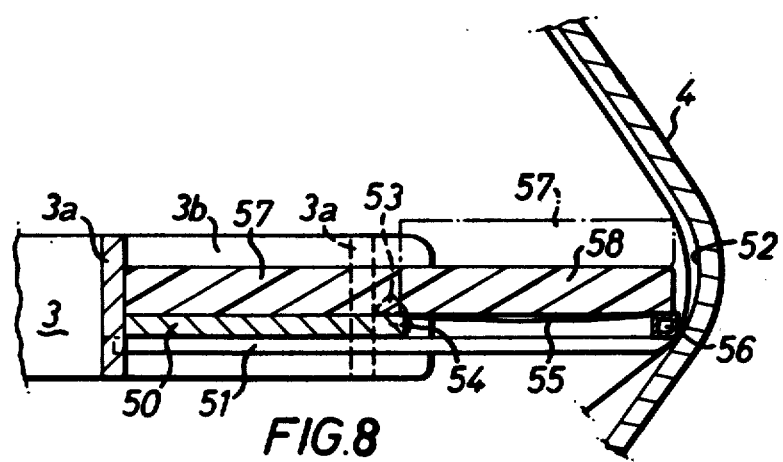
FIG. 8 is a fragmentary enlarged view on the line VIII—VIII of FIG. 7.
Figure 9:
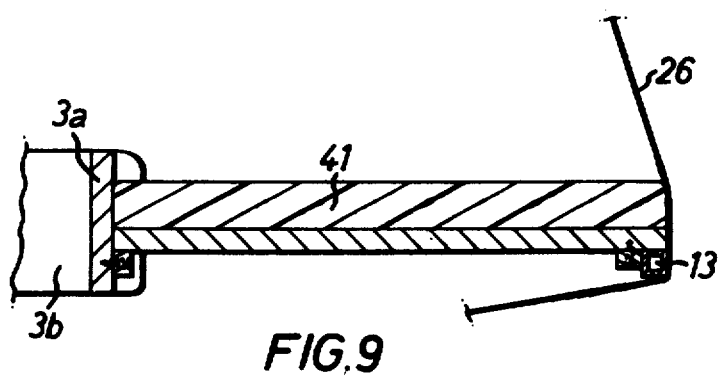
FIG. 9 is a view on the line IX—IX of FIG. 7.

Referring now to FIGS. 7 to 9, in a modified form the elevating roof is generally similar to that described above and like parts have the same references. Thus, the support framework is basically the same as that described above, except that relatively strong telescopic units 48 (see FIG. 7) are mounted transversely on the vehicle adjacent each facing 3b to provide a stronger support for the overhang, the movable arm 49 of each unit being rigidly fixed to the rod 13.

Also, (see FIG. 7) the longitudinal dimension of the roof opening is sufficient to accommodate full length, collapsible berths.

In accordance with a feature of this invention, one collapsible berth accommodated in the lengthened roof opening (see also FIG. 8) comprises a sliding berth board 50 which is slidably mounted on transversely extending runners 51 fixed one on each transverse facing 3b of the opening 3 and extending beyond said opening to adjacent the upper corner 52 of the roof member 4. The board 50 is retained on the runners by guide/stop members 53 and the inner longitudinal edge of said board comprises the respective longitudinal facing 3a of the roof opening 3. The berth board 50 can thus be moved transversely of the vehicle from a stowed (outward) position with its facing 3b against the guide/stops 53, as shown dotted in FIG. 8, to an extended (inward) position (as shown in solid lines in FIG. 8). Attached along the other (outer) longitudinal edge 54 of the board 50 is a longitudinal edge of a rectangular strip of material 55, the opposite edge of which is attached to a stay 56 extending longitudinally along the corner 52 of the roof member 4 adjacent the respective side of the vehicle. Thus, movement of the board to its extended position stretches the strip 55 to permit two elongated rectangular mattresses 57, 58 (which are preferably hinged together) to be laid side-by-side (as shown in solid lines) to provide the sleeping berth; in the stowed position, one mattress 57 is laid over the other 58 as shown dotted.

Referring to FIG. 9, in said modification, the berth boards 16, 18 are of single width instead of double width as described above, thereby providing for the roof opening 3 to be of extra length. Also, the loose board 41 is replaced by two half boards 41, each of which is integrally formed with a foam cushion. Thus, these cushion boards are of a convenient size for storage when not in use, and when located in place between the rod 13 of the elevating roof and their respective longitudinal facing 3a, they provide a further full length berth alongside the lengthened roof opening 3.

Many other modifications are possible within the scope of the following claims: e.g. instead of using boards for the sliding planar members 16, 17 and for the fixed planar members 18 and 19, frames with interlaced webbing, or similar, providing a planar support surface could be provided.

I claim:

1. For use in conjunction with a vehicle having a roof containing a substantially rectangular opening defining a pair of longitudinal edges and a pair of transverse edges in said roof, an elevating roof comprising (A) a rigid substantially rectangular member which is adapted to be hinged along one edge of said roof, parallel to one of said longitudinal edges, for movement between (1) a lowered position covering said substantially rectangular opening and (2) a raised position where said rigid member provides one wall of a covered area, (B) a canopy of foldable material extending between corresponding edges of said rigid member and said substantially rectangular opening, said canopy being adapted to provide the other walls of said covered area when said rigid member is in the raised position, and (C) a framework comprising first and second generally U-shaped members comprising a pair of moveable arms and a bridge member attached to said arms at one end thereof, said moveable arms being arranged so that they can be urged to respective limit positions where they support an opposite wall portion of said canopy in a position substantially outwardly beyond that longitudinal edge of said opening which is opposite said hinge, such that a region of said canopy associated with said opposite wall portion overhangs beyond said substantially rectangular opening to provide, at least for a lower part of said roof a covered area substantially greater in transverse dimension than said substantially rectangular opening, the improvement wherein: (1) the arms of said first U-shaped member each comprise a transversely slidable planar member supported in a plane above and substantially parallel to the plane of said opening and slidable from a stowed position directly over said vehicle roof to an extended position to one side of said vehicle; (2) the arms of said second U-shaped member are pivotably connected to respective planar members of said first U-shaped member; (3) the respective bridge members of said first and second U-shaped members are attached to said canopy at spaced positions opposite to said rigid member, and (4) including means for locking said first U-shaped member in said extended position such that when said rigid substantially rectangular member is raised and the bridge of said second U-shaped member is substantially simultaneously moved to a partially raised position and said first U-shaped member slid transversely outwardly, the limbs of said second U-shaped member pivot on their respective planar members of said first U-shaped member so that both of said first and second U-shaped members are urged simultaneously to their said respective limit positions.

2. An elevating roof according to claim 1, and further including two fixed planar members longitudinally spaced at each end of said substantially rectangular opening, each fixed planar member corresponding with its said associated slidable planar member, said respective fixed and slidable planar members in their stowed position being overlapped to enable said rigid member to be lowered to enclose said planar members, said slidable planar members in their extended transverse positions forming an extension of the fixed planar members to provide bed surfaces extending transversely of said vehicle.

3. An elevating roof according to claim 2, the improvement wherein said fixed and planar members are in the form of boards.

4. An elevating roof according to claim 1, and further comprising a collapsible berth located under said roof opening, said collapsible berth comprising a board mounted at or adjacent one longitudinal edge of said substantially horizontal opening , said board being of a length such that it can be accommodated within said opening, said board being arranged to be slidable transversely with respect to said opening between an outward stowed position and an inward erected position, and a strip of foldable material connected adjacent the respective side of said vehicle and the outer longitudinal edge of said slidable board whereby a planar berth surface is provided for supporting a mattress when said rigid member is in a raised position.

5. An elevating roof according to claim 4, the improvement wherein the inner longitudinal edge of said slidable board comprises its respective longitudinal edge of the roof opening, said roof opening being of increased width when the sliding board is in its said outward stowed position.

6. An elevating roof according to claim 5, further including a roof opening facing strip on the inner longitudinal edge of said slidable board.

* * * * *